US009343067B2

(12) United States Patent
Ariyaeeinia et al.

(10) Patent No.: US 9,343,067 B2
(45) Date of Patent: May 17, 2016

(54) SPEAKER VERIFICATION (75) Inventors: Aladdin M Ariyaeeinia, St Albans (GB); Surosh G Pillay, St Albans (GB); Mark Pawlewski, Holbrook (GB)

(73) Assignee: BRITISH TELECOMMUNICATIONS public limited company, London (GB)

( * ) Notice: Subject to any disclaimer, the term of this patent is extended or adjusted under 35 U.S.C. 154(b) by 480 days.

(21) Appl. No.: 13/126,859

(22) PCT Filed: Oct. 29, 2009

(86) PCT No.: PCT/GB2009/002579
§ 371 (c)(1),
(2), (4) Date: Apr. 29, 2011

(87) PCT Pub. No.: WO2010/049695
PCT Pub. Date: May 6, 2010

(65) Prior Publication Data
US 2011/0202340 A1  Aug. 18, 2011

(30) Foreign Application Priority Data

Oct. 29, 2008 (EP) .................................... 08253523

(51) Int. Cl.
*G10L 15/20* (2006.01)
*G10L 17/12* (2013.01)
*G10L 17/20* (2013.01)

(52) U.S. Cl.
CPC .................. *G10L 17/12* (2013.01); *G10L 17/20* (2013.01)

(58) Field of Classification Search
CPC ......... G10L 17/04; G10L 15/07; G10L 15/06; G10L 15/065
USPC .............. 704/231, 233, 236, 246, 247, 256.3, 704/278
See application file for complete search history.

(56) References Cited

U.S. PATENT DOCUMENTS 4,933,973 A  6/1990 Porter 6,519,563 B1 *  2/2003 Lee et al. ...................... 704/246
(Continued)

FOREIGN PATENT DOCUMENTS

| WO | 02/103680 | 12/2002 |
| WO | WO 02/103680 | 12/2002 |

OTHER PUBLICATIONS

International Search Report (3 pgs.) issued in International Application No. PCT/GB2009/002579.
(Continued)

*Primary Examiner* — Douglas Godbold
*Assistant Examiner* — Mark Villena
(74) *Attorney, Agent, or Firm* — Nixon & Vanderhye P.C.

(57) ABSTRACT

A speaker verification method is proposed that first builds a general model of user utterances using a set of general training speech data. The user also trains the system by providing a training utterance, such as a passphrase or other spoken utterance. Then in a test phase, the user provides a test utterance which includes some background noise as well as a test voice sample. The background noise is used to bring the condition of the training data closer to that of the test voice sample by modifying the training data and a reduced set of the general data, before creating adapted training and general models. Match scores are generated based on the comparison between the adapted models and the test voice sample, with a final match score calculated based on the difference between the match scores. This final match score gives a measure of the degree of matching between the test voice sample and the training utterance and is based on the degree of matching between the speech characteristics from extracted feature vectors that make up the respective speech signals, and is not a direct comparison of the raw signals themselves. Thus, the method can be used to verify a speaker without necessarily requiring the speaker to provide an identical test phrase to the phrase provided in the training sample.

23 Claims, 7 Drawing Sheets

(56) References Cited

U.S. PATENT DOCUMENTS

| | | | |
|---|---|---|---|
| 7,209,880 B1* | 4/2007 | Gajic et al. | 704/231 |
| 7,548,651 B2* | 6/2009 | Shozakai et al. | 382/224 |
| 2002/0029144 A1* | 3/2002 | Huang et al. | 704/233 |
| 2002/0173959 A1* | 11/2002 | Gong | 704/256 |
| 2002/0188444 A1* | 12/2002 | Menendez-Pidal et al. | 704/233 |
| 2003/0220791 A1* | 11/2003 | Toyama | 704/256 |
| 2005/0143997 A1* | 6/2005 | Huang et al. | 704/247 |
| 2006/0149558 A1* | 7/2006 | Kahn et al. | 704/278 |
| 2008/0195387 A1* | 8/2008 | Zigel et al. | 704/236 |
| 2008/0195389 A1* | 8/2008 | Zhang et al. | 704/246 |
| 2008/0221887 A1* | 9/2008 | Rose et al. | 704/246 |
| 2009/0006088 A1* | 1/2009 | Gajic et al. | 704/233 |

OTHER PUBLICATIONS

International Search Report for PCT/GB2009/002579, mailed Dec. 3, 2009.

Written Opinion of the International Searching Authority (5 pgs.) dated May 3, 2011 issued in corresponding International Application No. PCT/GB2009/002579.

European Examination Report (4 pgs.) dated Feb. 9, 2012 issued in corresponding European Application No. 09 745 091.0.

Overview of speaker enhancement techniques for automatic speaker recognition—J. Ortega-Garcia and L. Gonzalez-Rodriguez, ICSLP, 1996, pp. 929-932 (4 pgs.).

An evaluation of VTS and IMM for speaker verification in noise—Suhadi et al., Eurospeech 2003, Geneva, Switzerland, Sep. 1-4, 2003 (5 pgs.).

Speaker verification in noisy environments with combined spectral subtraction and missing feature theory—Drygajlo et al., IEEE Conference on Acoustics, Speech and Signal Processing, Seattle, Wash, USA May 1998, pp. 121-124 (4 pgs.).

A Monte Carlo method for score normalization in automatic speaker verification using Kullback-Leibler distance—Ben et al, ICASSO, Orlando, 2002, pp. 689-692 (4 pgs.).

Linear and non linear kernel GMM Supervector machines for speaker verification—Dehak et al, Interspeech 2007, Antwerp, Belgium 2007 (4 pgs.).

The use of cohort for normalized scores—Rosenberg et al, Proc ICSLP, pp. 599-609, 1992 (4 pgs.).

Analysis and comparison of score normalisation methods for text-dependent speaker verification—Ariyaeeinia et al, Proc of the Eurospeech 97, 1997, pp. 1379-1382 (4 pgs.).

Score normalisation for text-independent speaker verification systems—Auckenthaler et al, Digital Signal processing, 2000, vol. 10, No. 1-3, pp. 42-54 (13 pgs.).

Speaker adaptive cohort selection for Tnorm in text-independent speaker verification—Sturim et al, Proc ICAASSP 2005, pp. 741-744 (4 pgs.).

Model Compensation for Noises in Training and Test Data—Matrouf et al, Proc ICASSP, pp. 831-834, Munich, Germany, 1997 (4 pgs.).

Additive and Convolutional noises compensation for speaker recognition—Bellot et al, ICSLP'00, Beijing, China, 2000 pp. 799-802 (4 pgs.).

* cited by examiner

Figure 7

SPEAKER VERIFICATION

This application is the U.S. national phase of International Application No. PCT/GB2009/002579 filed 29 Oct. 2009 which designated the U.S. and claims priority to EP Patent Application No. 08253523.8 filed 29 Oct. 2008, the entire contents of each of which are hereby incorporated by reference.

FIELD OF THE INVENTION

This invention relates to a method of speaker verification, in particular a method of speaker verification providing improved accuracy under mismatched noise conditions.

BACKGROUND TO THE INVENTION

Speaker verification is used to determine whether a speaker is who he or she claims to be, based on a presented sample utterance. For example, an individual might have a bank account that they wish to access over the phone, where additional security is provided by speaker verification whereby the individual has to present a speech sample to the system, which verifies that the individual is who they claim to be.

Speaker verification consists of two phases: training and testing. In the training phase, the utterances spoken by an individual whose identity has already been confirmed (using passwords etc) are used to build a reference model. In the testing phase, a sample utterance received from an individual is compared against the reference model associated with the claimed identity.

Currently, the most common methods for speaker verification, especially operating in the text-independent mode where there are no constraints on the textual content of speech, are based on GMM-UBM (Gaussian Mixture Models-Universal Background Model) and GMM-SVM (Gaussian Mixture Models-Support Vector Machines). Other effective methods for this purpose include approaches based on GMM (Gaussian Mixture Models) and HMM (hidden Markov Models).

Regardless of the method used, in practice, speaker verification accuracy can be adversely affected by variations in speech characteristics due to additive noise (e.g. background noise). Such variations can cause a mismatch between the training and testing speech material from the same speaker, which in turn can reduce the verification accuracy. For example, if the training phase is performed in a noisy environment, the reference model will reflect that, which in turns means that if the test phase is performed in a quiet environment, mismatches can occur. Similarly, the opposite is also true with clean training data, but noisy test data.

Over the last few years, considerable research has been carried out into methods for minimising the effects of speech variation due to additive noise on speaker verification accuracy. This has resulted in various methods being developed such as spectral subtraction, Kalman filtering and missing-feature theory. These approaches focus on enhancing the quality of the test material (speech) before the testing process. In other words, they assume that the training material (speech) is always free from any form of degradation or noise.

Another method referred to as data-driven Parallel Model Combination (PMC) has also been proposed, and involves estimating degradations in testing and training material, and using these estimations to minimise the data mismatch conditions. However, the technique requires contaminating the reference utterance (and hence model) for the target client and also the test utterance with each test. Effectively, this requires rebuilding the reference model with each test trial which is computationally expensive and impractical in a real world situation.

SUMMARY OF THE INVENTION

It is the aim of embodiments of the present invention to address one or more of the above-stated problems, thereby providing an improved method of speaker verification, in particular under mismatched noise conditions.

According to one aspect of the present invention, there is provided a method of verifying the identity of a speaker in a speaker verification system, said method comprising:
  i) building a general speaker model using feature vectors extracted from sample speaker utterances;
  ii) modifying a training speaker utterance provided by the speaker in a training phase using a noise sample to obtain a modified training speaker utterance, and modifying a reduced set of sample speaker utterances using a noise sample to obtain a modified set of background speaker utterances;
  iii) generating an adapted target speaker model by using feature vectors extracted from the modified training speaker utterance to adapt the general speaker model, and generating a set of adapted background speaker models by using feature vectors extracted from the modified set of background speaker utterances to adapt the general speaker model;
  iv) calculating a target match score based on a comparison between the adapted target speaker model and the test voice sample, and calculating a set of background match scores based on a comparison between the set of adapted background speaker models and the test voice sample;
  v) determining a final match score representing the degree of matching between the characteristics of the training speaker utterance and the test voice sample, wherein the final match score is dependent on the difference between the target match score and the mean background match scores.

Preferably, the final match score is dependent on the difference between the target match score and the mean background match scores divided by the standard deviation of the background match scores.

Calculating the target match score may comprise calculating the probability of a match between the feature vectors associated with the test voice sample and the adapted target speaker model, and calculating the set of background match scores may comprise calculating the probability of a match between the feature vectors associated with the test voice sample and each of the adapted background speaker models in the set of adapted background speaker models.

The method may further comprise calculating a general match score based on a comparison between the general speaker model and a test voice sample. And calculating the general match score may comprise calculating the probability of a match between the feature vectors associated with the test voice sample and the general speaker model.

Preferably, the target match score is normalised with respect to the general match score, and each of the background match scores is normalised with respect to the general match score before determining the final match score.

The noise and test speaker samples can be extracted from a single test speaker utterance provided, by the speaker, which may be part of a test phase subsequent to a training phase.

The final match score may be compared to a predetermined threshold.

Preferably, the feature vectors are short term spectral representations of speech.

According to a second aspect of the present invention, there is provided a speaker verification system for verifying the identity of a speaker in a speaker comprising:
i) a model building module adapted to build a general speaker model using feature vectors extracted from sample speaker utterances, to modify a training speaker utterance provided by the speaker in a training phase using a noise sample to obtain a modified training speaker utterance, to modify a reduced set of sample speaker utterances using a noise sample to obtain a modified set of background speaker utterances, to generate an adapted target speaker model by using feature vectors extracted from the modified training speaker utterance to adapt the general speaker model, and to generate a set of adapted background speaker models by using feature vectors extracted from the modified set of background speaker utterances to adapt the general speaker model;
ii) a matching module adapted to calculate a target match score based on a comparison between the adapted target speaker model and the test voice sample, and to calculate a set of background match scores based on a comparison between the set of adapted background speaker models and the test voice sample;
iii) a verification module adapted to determine a final match score representing the degree of matching between the characteristics of the training speaker utterance and the test voice sample, wherein the final match score is dependent on the difference between the target match score and the mean background match scores.

The inventors have established experimentally that this method can significantly improve verification accuracy.

The technique results in significantly improved speaker verification accuracy in mismatched noise conditions and is more computationally efficient than previous methods. The invention is particularly advantageous when training utterances and testing utterances are captured under different background noise conditions (that is, at the time of testing, the characteristics and levels of noise being different from those at the time of training). Indeed, such a situation would even arise when the training utterance is captured in completely quiet background noise conditions and test utterances captured when there is significant background noise, and vice versa The technique works by bringing the condition of background data (from which score normalisation factors are extracted) close to the condition of test material, which is also in addition to bringing the condition of training material to that of test material.

BRIEF DESCRIPTION OF THE DRAWINGS

For a better understanding of the present invention reference will now be made by way of example only to the accompanying drawings, in which.

DESCRIPTION OF PREFERRED EMBODIMENTS

The present invention is described herein with reference to particular examples. The invention is not, however, limited to such examples.

The present invention may be embodied in hardware, software or a combination of hardware and software. The invention provides a method of verifying the identity of a user in a speaker verification system. The method builds a general model of user utterances using a set of general training speech data. The user also trains the system by providing a training utterance, such as a passphrase or other spoken utterance. Then in a test phase, the user provides a test utterance which includes some background noise as well as a test voice sample. The background noise is used to modify the training data as well as a set of background speaker samples before the modified training data and modified background noise samples are used to adapt the general model to generate an adapted target speaker model and a set of adapted background speaker models respectively. In effect, the condition of training data is thus brought closer in condition of test voice sample.

A target match score is then calculated based on a comparison between the adapted target speaker model and the test voice sample, and further a set of background match scores is calculated based on a comparison between the set of adapted background speaker models and the test voice sample. A final match score is calculated according to a preferred method and is based on the difference between the target match score and the mean of the background match scores. This final match score gives a measure of the degree of matching between the test voice sample and the training speaker utterance. The final match score represents the degree of matching between the speech characteristics (based on extracted feature vectors) that make up the respective speech signals, and is not a direct comparison of the raw signals themselves. Thus, the method can be used to verify a speaker without necessarily requiring the speaker to repeat in a test phase the same words/phrases used for the training phase.

Figure 1:
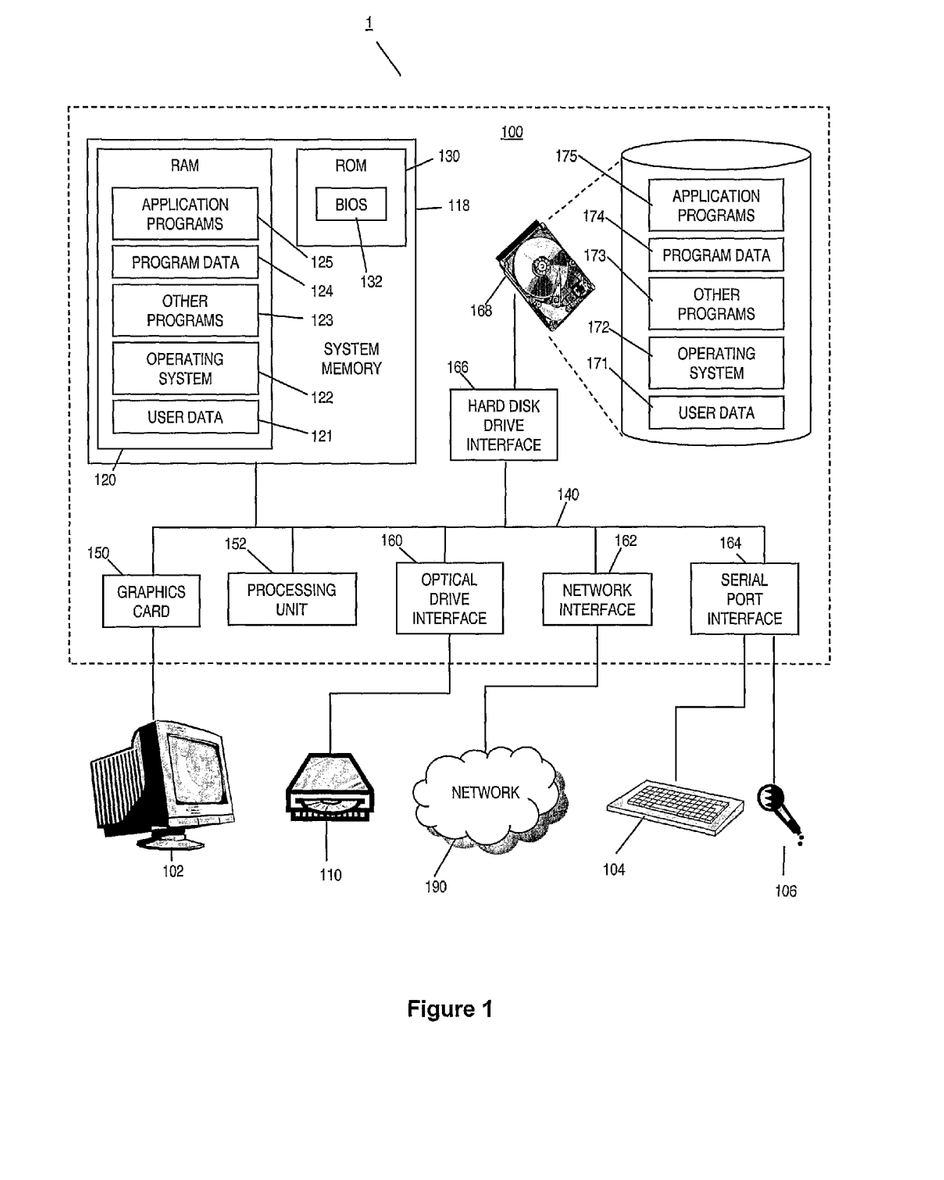
FIG. 1 is a block diagram of the general purpose computer system used in an example of the present invention.

FIG. 1 illustrates a system block diagram of the system components of a computer system 1. The computer system may be a PC, server, laptop or similar. With reference to FIG. 1, the internal components of the computer system 1, located within a base unit 100, include a mother board upon which is mounted system memory 118 which itself comprises random access memory 120, and read only memory 130. In addition, a system bus 140 is provided which couples various system components including the system memory 118 with a processing unit (CPU) 152. Also coupled to the system bus 140 is a graphics card 150 for providing a video output to the monitor 102; an optical drive interface 160 which controls the optical disk drive 110 so as to read data from and write data to a removable optical disk inserted therein; and a serial port interface 164, which provides an input and output interface to and from the system. In this example, the serial port interface 164 provides an input port for a keyboard 104, and a microphone 106.

Additionally coupled to the system bus 140 is a network interface 162 in the form of a network card or the like arranged to allow the computer system 1 to communicate with other computer systems over a network 190. The network 190 may be a local area network, wide area network, local wireless network, or the like. The network interface 162 allows the computer system 1 to form logical connections over the network 190 with other computer systems such as other computers, mobile devices, servers and routers, for the exchange of programs or data. Thus, for example a user may connect to the computer system 1 remotely over a network 190 that includes the Internet using a suitably configured laptop or mobile phone.

In addition, there is also provided a hard disk drive interface 166 which is coupled to the system bus 140, and which controls the reading from and writing to of data or programs from or to a hard disk drive 168. All of the hard disk drive 168, optical disks used with the optical drive 110, and any other storage medium such as memory sticks and flash cards (not shown), provide non-volatile storage of computer readable instructions, data structures, program modules, and other data for the computer system 1. It will be understood by a skilled reader that other types of computer readable media which can store data may be used, such as magnetic cassettes, tape storage drives, digital versatile disks, and the like.

Each of the computer readable storage media such as the hard disk drive 168, or any optical disks, may store a variety of programs, program modules, or data. In particular, the hard disk drive 168 in the embodiment particularly stores a number of application programs 175, application program data 174, other programs required by the computer system 1 or the user 173, a computer system operating system 172 such as Microsoft Windows, Linux, Unix, or the like, as well as user data in the form of files, data structures, or other data 171. The hard disk drive 168 provides non volatile storage of the aforementioned programs and data such that the programs and data can be permanently stored without power.

In order for the computer system 1 to make use of the application programs or data stored on the hard disk drive 168, or other computer readable storage media, the system memory 118 provides the random access memory 120, which provides memory storage for the application programs, program data, other programs, operating systems, and user data, when required by the computer system 1. When these programs and data are loaded in the random access memory 120, a specific portion of the memory 125 will hold the application programs, another portion 124 may hold the program data, a third portion 123 the other programs, a fourth portion 122 the operating system, and a fifth portion 121 may hold the user data. It will be understood by the intended reader that the various programs and data may be moved in and out of the random access memory 120 by the computer system as required. More particularly, where a program or data is not being used by the computer system, then it is likely that it will not be stored in the random access memory 120, but instead will be returned to non-volatile storage on the hard disk 168.

The system memory 118 also provides read only memory 130, which provides memory storage for the basic input and output system (BIOS) containing the basic information and commands to transfer information between the system elements within the computer system 1. The BIOS is essential at system start-up, in order to provide basic information as to how the various system elements communicate with each other and allow for the system to boot-up.

Where the computer system 1 is used in a network environment, it should further be understood that the application programs, other programs, and other data which may be stored locally in the computer system may also be stored, either alternatively or additionally, on remote computers, and accessed by the computer system 1 by logical connections formed over the network 190.

Exemplary embodiments of the invention are realised, at least in part, by executable computer program code which may be embodied in the application program data stored in the hard disk 174. When such computer program code is loaded into the memory 124 for execution, it provides, in conjunction with the executing processing unit 152 and associated bus 140, network 190, I/O devices and the like, a computer program code structure which is capable of performing at least part of a method in accordance with the herein below described exemplary embodiments of this invention.

Furthermore, a person skilled in the art will appreciate that the computer program structure referred can correspond to the process flow charts described below, where each step of the flow chart can correspond to at least one line of computer program code and that such, in combination with the processing unit 152 and other elements of the computer system 1, provides apparatus for effecting the described process.

Figure 2:
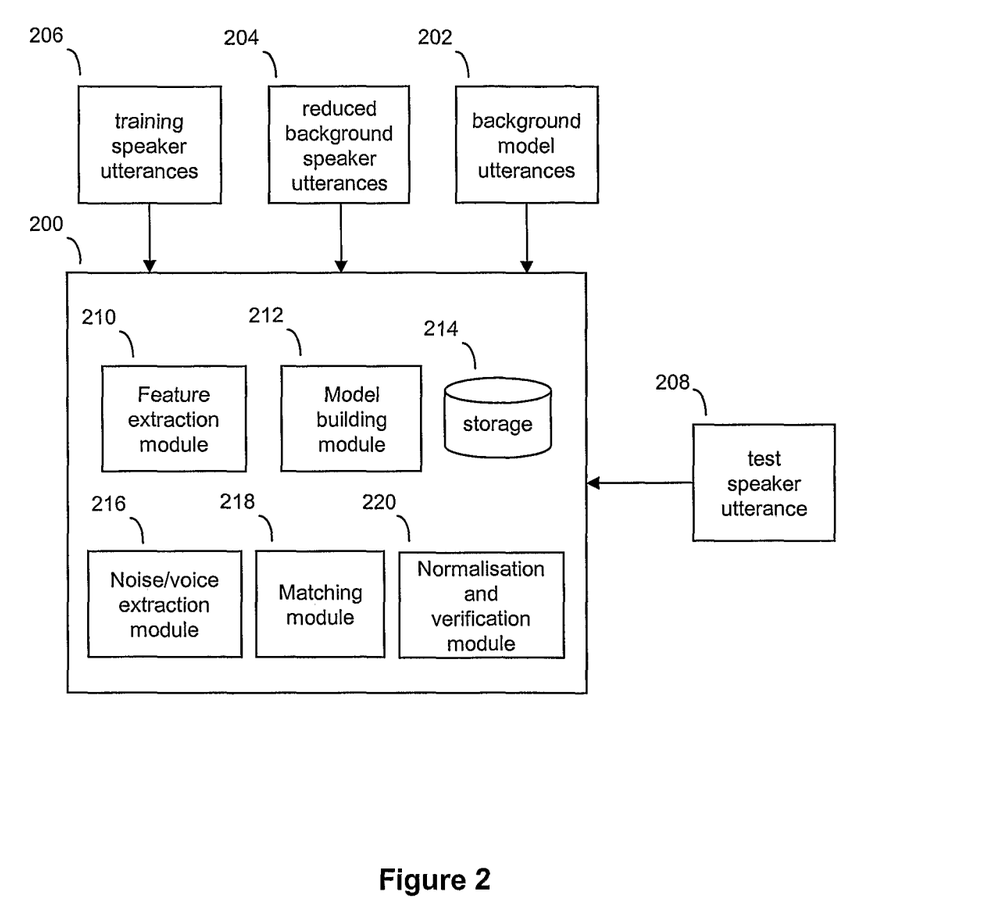
FIG. 2 is a block diagram showing a speaker verification system in an example of the present invention.

In an exemplary embodiment of the invention, speaker verification system 200 as shown in FIG. 2 is implemented on the computer system 1. A person skilled in the art will appreciate that the speaker verification system 200, and individual modules that make up the speaker verification system 200, can be embodied in computer executable program code as described above. Alternatively, the speaker verification 200 and associated modules can be embodied in hardware components, or a combination of hardware components and computer executable program code.

FIG. 2 shows a speaker verification system 200 comprising a feature extraction module 210, a model building module 212, storage 214, a noise/voice extraction module 216, a matching module 218 and a normalisation and verification module 220. The speaker verification system 200 takes as inputs sets of speech signals. These include a set of background model utterances 202, a reduced set of background speaker utterances 204, a set of training speaker utterances 206, and a set of test speaker utterances 208.

The set of background model utterances is typically made up of a collection of spoken words or phrases taken from a large collection of different speakers (e.g. over 1000). In most situations, the set is chosen to give a good representation of a general population. However, the set can be selected based on the typical user that the system is to verify. For example, if the system will only be used to verify males, aged between 20 and 50, then the model set of background speaker utterances can be selected to only include utterances from males aged between 20 and 50 accordingly. Similarly, if the phrases that are to be tested are limited to say only spoken numbers between 1 and 10, then the set of background model utterances can be limited to only spoken numbers ranging from 1 to 10. The set is referred to as "model" utterances as they are used to generate a universal background model (UBM) as will be described later.

The reduced set of background speaker utterances 204 is similar to the set of background model utterances 202 and also comprises a general selection of words and phrases spoken by a selection of speakers. The number of speakers used here, typically around 150, is less than that used in the set of background model speaker utterances 202, and thus results in a smaller set of utterances.

The background model set 202 and reduced background set 204 can be input into the system 200 and stored locally in the storage 214, which for ms part of the computer system 1 storage of the hard disk or RAM.

The set of training speaker utterances 206 is provided by a user wishing to train system 200 to later recognise and verify their speech presented as the test speaker utterance 208. Both the training speaker utterances 206 and test speaker utterance 208 can be input to the speaker verification system 200 via suitable input apparatus such as the microphone 106 of the computer system 1, or may be provided by some other way such as over the network 190, for example via a mobile phone or laptop.

The operation of the speaker verification system 200 and how the various constituent modules are used to verify a speaker will now be described with reference to the flow charts of FIGS. 3 to 5.

The process of speaker verification is loosely comprised of two phases: a training phase and a testing phase. During the training phase, a single general speaker model is generated from the set of background model utterances 202, and a set of training speaker utterances 206 from the enrolling user is provided for adapting the general speaker model to a model that reflects the enrolling user. Then, when the same user wishes to be verified later, they provide a sample of their speech, a test speaker utterance 208, which is verified according to an embodiment of the invention.

Figure 3:
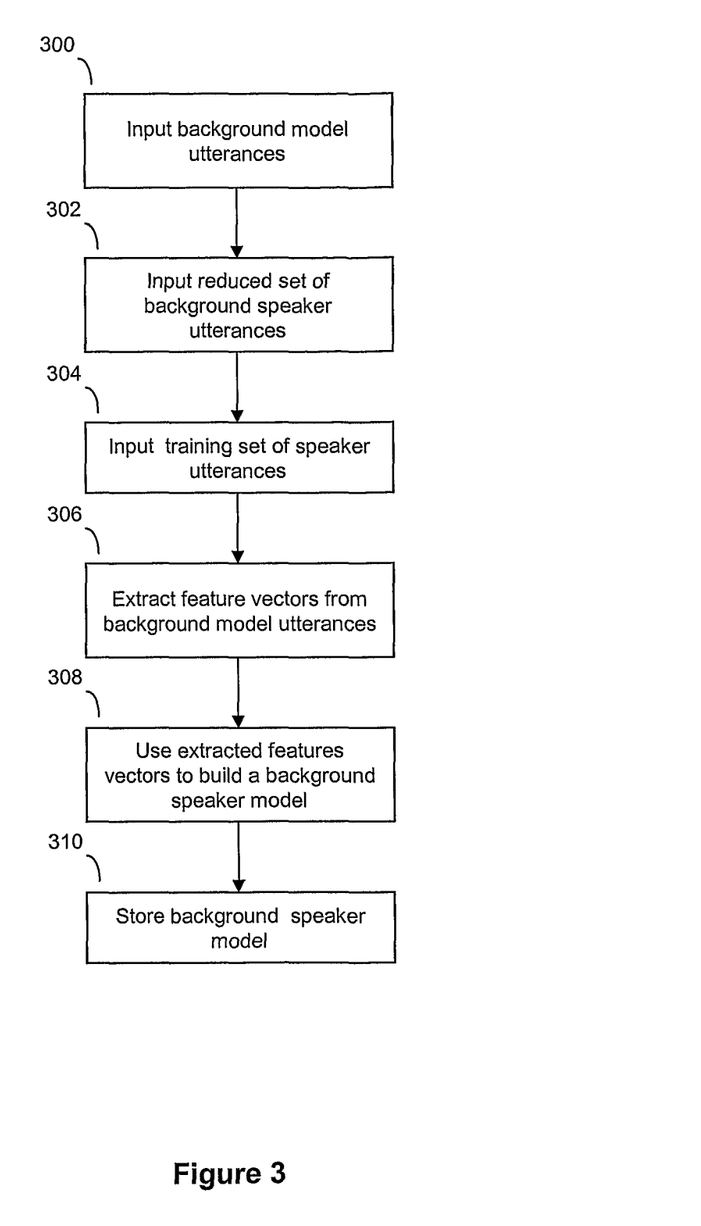
FIG. 3 is a flow chart illustrating the steps of receiving training utterances and building a speaker models.

Referring now to FIG. 3, in step 300 and 302, the background model utterances 202 and the reduced set of background speaker utterances 204 respectively are provided to the speaker verification system 200. A person skilled in the art will appreciate that both sets of utterances 202 and 204 may already be stored locally in the storage 214 of the speaker verification system.

In step 304, a user enrols with the speaker verification system 200. This enrolling process includes verifying the user's identity before accepting a set of training speaker utterances from the user. For example, a user might register for the speaker verification system 200 as part of a bank account registration process, whereby the speaker verification component would lend an additional level of security to account access. So, the user's identity would already have been verified by the bank enrolment process, and then the user is passed onto the speaker verification system 200 for registering and training of the system. In the enrolment process, the user may be asked to provide a speech sample in response to a question such as a passphrase/password request. Alternatively, the speech sample may simply be taken from general speech from the user during registration such as during discussions with an operator. In both cases, the result is capturing a set of training utterances 206 provided by the user (speaker), which is input to the speaker verification system 200 in step 304 and stored in the storage 214. In this example, we will take the training set to be the spoken passphrase "my password is my key". The training set of speaker utterances 206 is typically stored with the identity or some reference to the identity of the user, so that it can be retrieved from the system at a later stage for use in verifying the identity of the same user.

In step 306, feature vectors are extracted from the background model utterances 202 by the feature extraction module 210. These feature vectors are short term spectral representations of speech, such as linear predictive coding coefficients (LPCC) and Mel-frequency cepstrum coefficients (MFCC). In the case of LPCC feature vectors, speech segments of 16 ms are extracted at a rate of 8 ms (giving a 50% overlap). It is desirable to keep the segments below 25-30 ms in length. In step 308, the extracted features are used to build a background speaker model by the model building module 212, which in preferred embodiments is a universal background model (UBM), and more specifically a Gaussian Mixture Model UBM or GMM-UBM.

The background model is then stored in the storage 214 in step 310.

Figure 6:
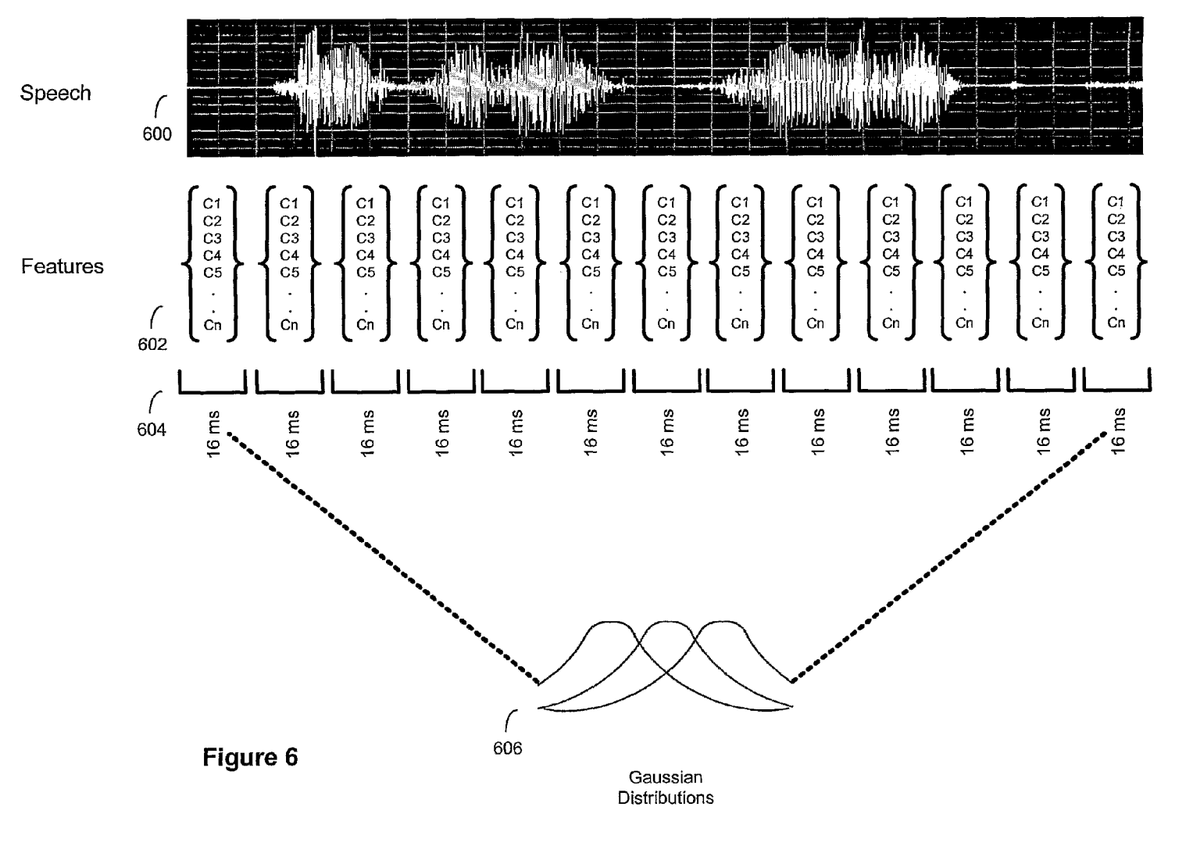
FIG. 6 is illustrative of an input speech signal, associated feature vectors, and resulting Gaussian distributions of the input speech.

FIG. 6 illustrates an example of an input speech signal 600, wherein feature vectors 602 are generated for every 16 ms segment 604 of the signal. The distribution of the feature vectors across the combination of dimensions is then used to generate a set of Gaussian distributions 606 using an expectation-maximisation approach. The set of Gaussian distributions 606 represents a general or universal background model (specifically a GMM-UBM).

Figure 4:
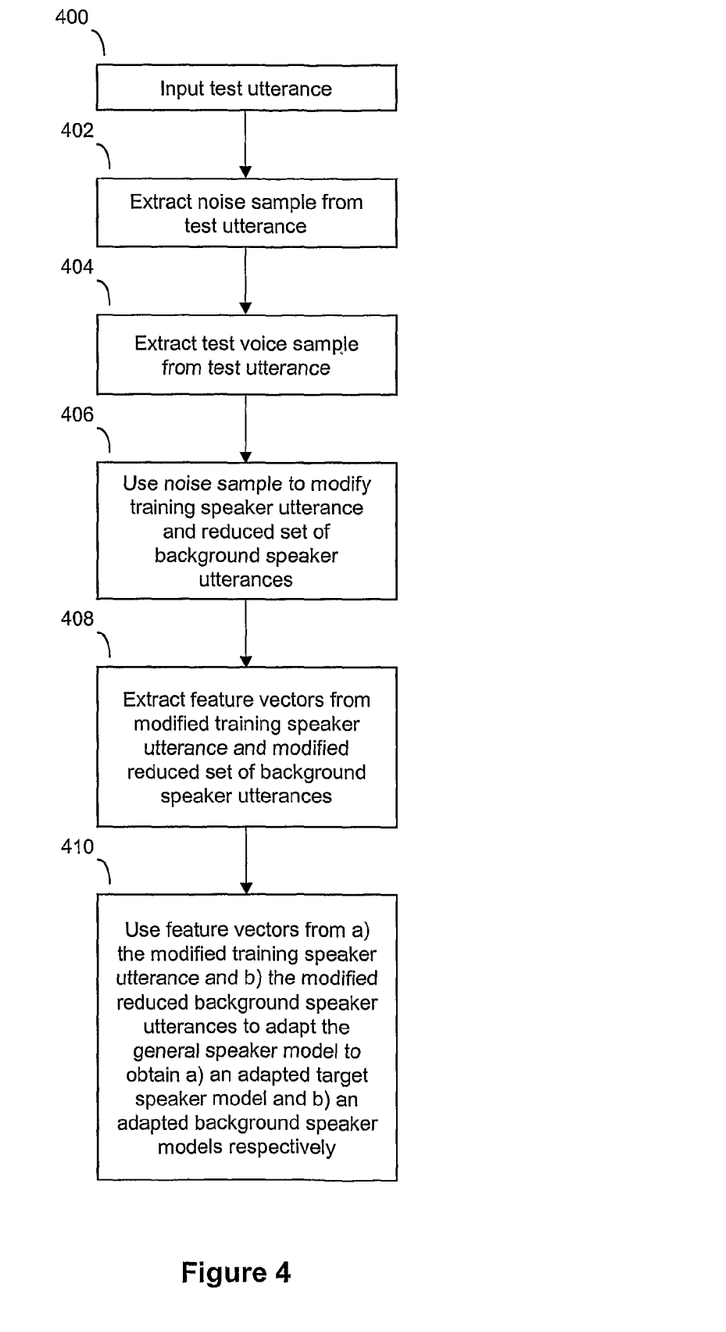
FIG. 4 is a flow chart illustrating the steps for modifying and adapting various speaker models.

FIG. 4 shows the steps taken by the speaker verification system 200 during a test phase where a user later inputs some speech in order to verify their identity. Thus, the user provides the passphrase provided in the earlier training sequence (step 304) or some other test utterance to the speaker verification system 200 in step 400. This test speaker test utterance 208 is a speech signal, and includes some portion (usually at the very start and very end of the sample) where the user is not speaking and thus comprises only background noise. This occurs for example when a user is asked to say their passphrase after a tone, and then take a split second after the tone to actually say the passphrase, and/or where the system samples for a small duration after the passphrase has been spoken as well.

In step 402, a noise sample is extracted from the test speaker utterance 208. Whilst it is usually easiest to obtain the noise sample from the start of input test utterance, a person skilled in the art will appreciate that it could be taken from any part of the input signal that is provided as part of the input test utterance, and indeed could still work with a small amount of the user's actual speech. The length of the noise sample is typically 0.2 seconds long. Compare this to typical test utterance samples of 3 seconds or longer. A longer noise sample would improve accuracy. Furthermore, techniques can be used to capture the background noise during a silent period from the user's general dialogue.

In step 404, the test voice sample (the portion of the signal attributable to the user's speech/passphrase) is extracted from the test speaker utterance 208.

Figure 7:
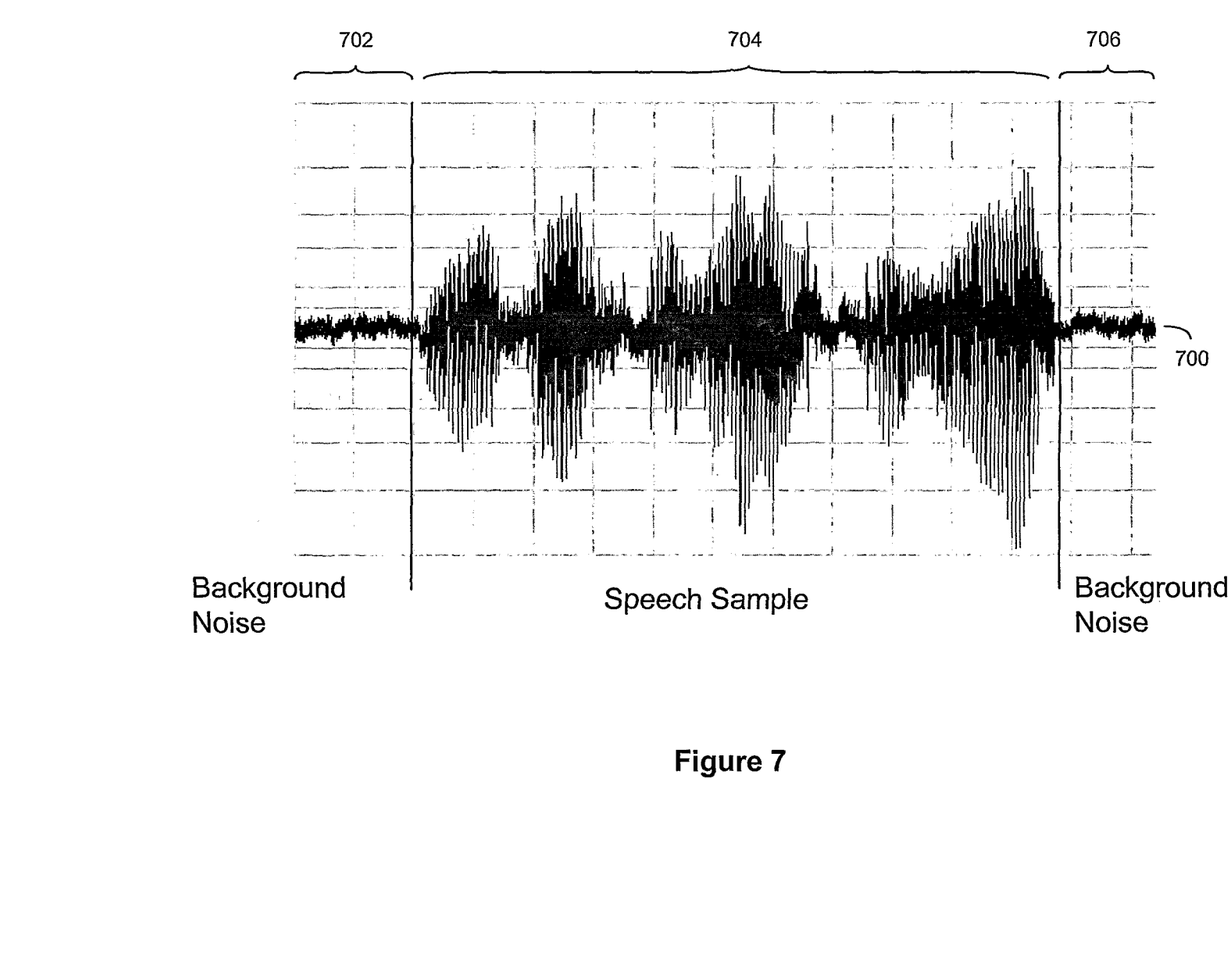
FIG. 7 shows a typical speech signal sample comprising background noise segments and a voice sample segment.

FIG. 7 shows a sample signal 700 of a typical test speaker utterance 208. As can be seen, the signal 700 is made up of three distinguishable portions: an initial segment of background noise 702, the main test voice sample 704 segment, and a final segment of background noise 706.

In step 406, the extracted noise sample is used to modify the set of training speaker utterances 206 and the reduced set of background speaker utterances 204. This is done by adding the extracted noise sample signal to the set of training speaker utterances and reduced set of background speaker utterances to give a modified set of training speaker utterances and a modified reduced set of background speaker utterances respectively. The addition of the noise is done repeatedly (as the noise sample is typically quite short), so that effectively a continuous noise sample is used for modification. The addition is simply an addition of signal amplitudes over the time domain. This step can be performed by the model building module 212.

In step 408, the feature extraction module 210 extracts feature vectors from the modified training speaker utterances from step 406, and also extracts the feature vectors from the modified reduced set of background speaker utterances. Thus feature vectors associated with the modified training speaker utterances and feature vectors from the modified reduced set of background speaker utterances are obtained.

In an alternative approach, feature vectors can be extracted from the noise sample and used to modify feature vectors extracted from the respective training speaker utterances 206 and the reduced set of background speaker utterances 204. In effect, the modification to the training speaker utterances and background speaker utterances are made in the feature domain in this alternative rather than the time domain as in steps 406 and 408.

In step 410, the two sets of feature vectors obtained from step 408 are used to adapt the general background speaker model stored in step 310 to obtain adapted speaker models using the model building module 210. In preferred examples of the invention, the technique used to adapt the general speaker model is a modified maximum a posteriori (MAP). A person skilled in the art will understand that other adaptation techniques such as the standard MAP or one-step MAP-based adaptation can be used instead to obtain the parameters for the models in question. Thus, we obtain an adapted target speaker model by using the feature vectors from the modified training speaker utterances to adapt the general speaker model through a modified MAP approach. And similarly, we obtain a set of adapted background speaker models by using the feature vectors from the modified reduced background speaker utterances to adapt the general speaker model using the same modified MAP approach as above. The number of models in the set of adapted background speaker models will be the same as the number of speakers in the original reduced set of background speaker utterances, typically around 150.

Following from step 410, we end up with an adapted target speaker model; a set of adapted background speaker models; and the general speaker model (generated earlier from step 310).

Figure 5:
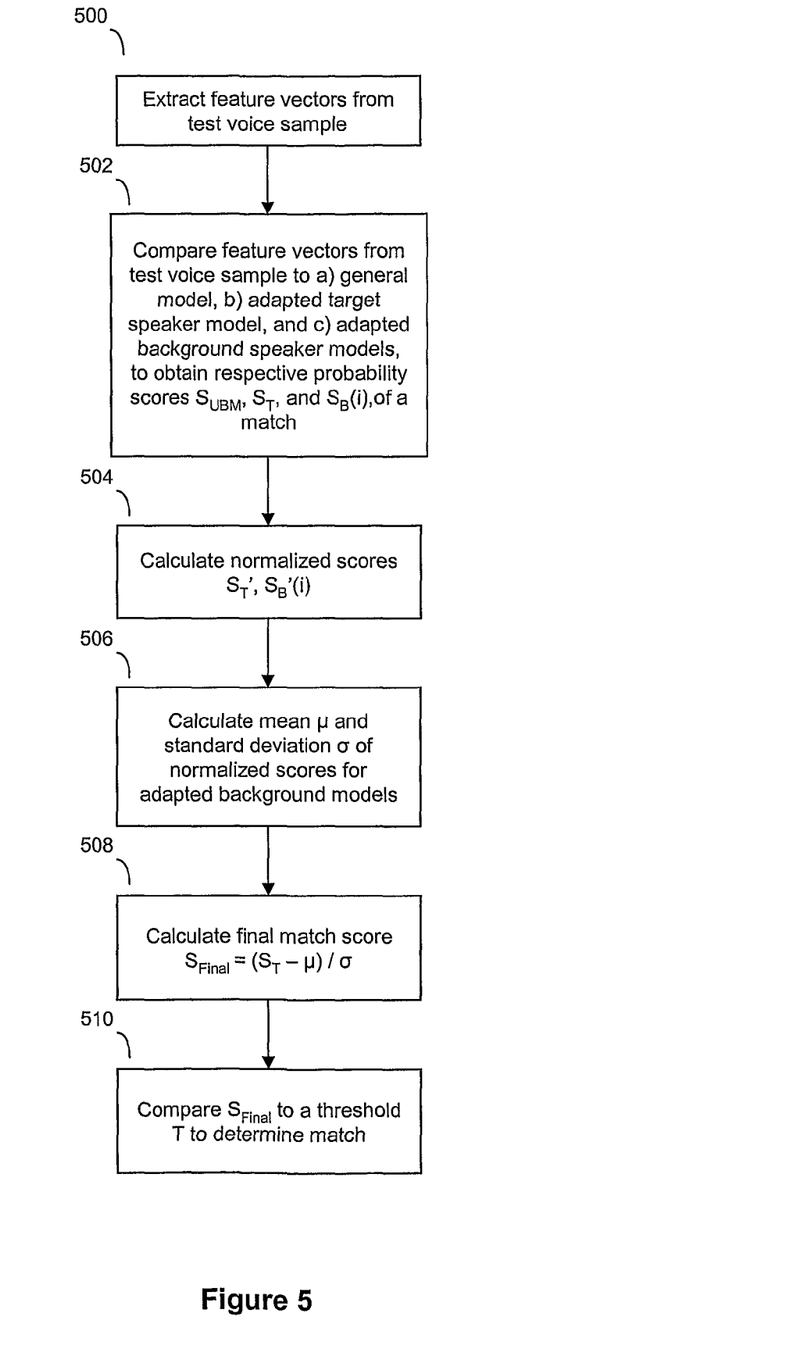
FIG. 5 is a flow chart illustrating the steps for comparing feature vectors from the test voice sample, calculating normalised match scores and determining a match score between the test voice sample and the training sample.

Turning now to FIG. 5, which is a flow chart detailing the method of comparing the extracted test voice sample to the generated speaker models to determine a match score representing the degree of matching between the test speaker utterance and the training utterance.

In step 500, the feature vectors from the test voice sample (obtained from step 404) are extracted by the feature extraction module. In step 502, the test voice sample feature vectors are compared to each of the speaker models previously generated by the matching module 218. So, the test voice sample feature vectors are compared to the adapted target speaker model, to each of the adapted background speaker models, and to the general speaker model. The method of comparison is GMM-UBM (using a standard scoring procedure, or optionally a fast scoring procedure can be used) and results in a series of match scores in the form of log-likelihoods.

So the comparison between the test voice sample feature vectors and the general background speaker model results in a log-likelihood score of $S_{UBM}$. The comparison between the test voice sample feature vectors and the adapted target speaker model results in a log-likelihood score of $S_T$. The comparison between the test voice sample feature vectors and each of the adapted background speaker models results in a set of log-likelihood scores $S_B(i)$, where i=(1, N), and N is the number of different speakers in the reduced set of background utterances (typically around 150 as described earlier), and thus the number of resulting adapted background speaker models.

Once $S_T$, $S_B(i)$, and $S_{UBM}$ have been calculated, a normalisation step in 504 is performed by the normalisation and verification module 220. Thus, a normalised adapted target speaker score of $S_T'$ is calculated as:

$$S_T' = S_T - S_{UBM} \tag{1}$$

Similarly, a set of normalised adapted background speaker scores $S_B'(i)$ is calculated (for i=1,N)

$$S_B'(i) = S_B(i) - S_{UBM} \tag{2}$$

for i=(1, N), where N=total number of speakers in set of background speaker utterances.

In step 506; a mean score, μ, of the normalised scores $S_B'(i)$ for the adapted background speaker models is calculated by the normalisation and verification module 220. Also, a standard deviation, σ, of the normalised scores $S_B'(i)$ for the adapted background speaker models is calculated.

In step 508, a final match score $S_{Final}$ is calculated by the normalisation and verification module 220 using the following formula:

$$S_{Final} = (S_T' - \mu)/\sigma \tag{3}$$

A person skilled in the art will appreciate that when equation (3) is used to obtain the final score, the normalisation step 504 is optional and the raw match scores before normalisation used instead.

This final match score $S_{Final}$ gives a measure of the degree of matching between the test speaker utterance and the training speaker utterance. The match score represents the degree of matching between the speech characteristics (based on the feature vectors) that make up the respective speech signals, and is not a direct comparison of the raw signals themselves. Thus, the method can be used to verify a speaker without necessarily requiring the speaker to repeat in a test phase the same words/phrases used for the training phase.

In step 510, the final match score $S_{Final}$ can be compared to a threshold value to give a discrete "match" or "no match" result for the input test speaker utterance.

The threshold may be set in advance to a level that reflects the accuracy of the match required for a speaker to be verified. A high threshold will require a correspondingly high final match score before a speaker is verified. This threshold value can be stored in the storage 214 in advance testing of the enrolling user.

In examples where the normalisation step 504 has been skipped, the following steps of 506 to 510 are performed using the original adapted target speaker score $S_T$ and adapted background speaker score $S_B(i)$ i.e. without subtracting $S_{UBM}$.

So far, investigations have been directed at compensating/modifying for one type of normalisation. The technique proposed here can potentially be useful for use with other types of normalisation methods. Similarly, it has been found that the use of this method, whereby a noise sample from the test utterance is used to modify training and background speaker samples before adapting a general speaker model, can also be used to enhance the performance of PMC GMM-SVM type models. However, the computation cost of PMC GMM-SVM is significantly higher due to the necessity for retraining in the test phase. A person skilled in the art will appreciate that the same principles taught in exemplary embodiments above could also be applied to other modelling methods.

In general, it is noted herein that while the above describes examples of the invention, there are several variations and modifications which may be made to the described examples without departing from the scope of the present invention as defined in the appended claims. One skilled in the art will recognise modifications to the described examples.

The invention claimed is:

1. A method of verifying the identity of a speaker in a speaker verification system, said method comprising:
   i) building, using a computer system including at least one computer processor, a general speaker model using feature vectors extracted from a first set of speaker utterances taken from a large population of speakers;

ii) receiving training speaker utterances provided by the speaker in a training phase, modifying the received training speaker utterances provided by the speaker in the training phase using a noise sample to obtain modified training speaker utterances, and modifying a second set of sample speaker utterances using the noise sample to obtain a modified set of background speaker utterances, wherein said second set comprises speaker utterances taken from a population of speakers that is less that in the first set;

iii) generating an adapted target speaker model by using feature vectors extracted from the modified training speaker utterances to adapt the general speaker model, and generating a set of adapted background speaker models by using feature vectors extracted from the modified set of background speaker utterances to adapt the general speaker model;

iv) receiving a test voice sample and calculating a target match score based on a comparison between the adapted target speaker model and the received test voice sample, and calculating a set of background match scores based on a comparison between the set of adapted background speaker models and the test voice sample;

v) determining a final match score representing the degree of matching between the characteristics of the training speaker utterance and the test voice sample, wherein the final match score is dependent on the difference between the target match score and the mean background match scores; and vi) verifying the identity of the speaker in the speaker verification system based on the final match score.

2. A method according to claim 1, wherein the final match score is dependent on the difference between the target match score and the mean background match scores divided by the standard deviation of the background match scores.

3. A method according to claim 1, wherein calculating the target match score comprises calculating the probability of a match between the feature vectors associated with the test voice sample and the adapted target speaker model, and calculating the set of background match scores comprises calculating the probability of a match between the feature vectors associated with the test voice sample and each of the adapted background speaker models in the set of adapted background speaker models.

4. A method according to claim 1 further comprising calculating a general match score based on a comparison between the general speaker model and a test voice sample.

5. A method according to claim 4, wherein calculating the general match score comprises calculating the probability of a match between the feature vectors associated with the test voice sample and the general speaker model.

6. A method according to claim 4, wherein the target match score is normalised with respect to the general match score, and each of the background match scores is normalised with respect to the general match score before determining the final match score.

7. A method according to claim 1, wherein the noise and test speaker sample are extracted from a test speaker utterance provided by the speaker in a test phase subsequent to an initial training phase.

8. A method according to claim 1, wherein the final match score is compared to a predetermined threshold, and verification of the identity of the speaker in the speaker verification system is based on the comparison of the final match score to the predetermined threshold.

9. A method according to claim 1 wherein the feature vectors are short term spectral representations of speech.

10. A speaker verification system for verifying the identity of a speaker comprising:
a computer system, including at least one computer processor, the computer system being configured to provide at least:

i) a model building module adapted to build a general speaker model using feature vectors extracted from a first set of speaker utterances taken from a large population of speakers, to receive training speaker utterances provided by the speaker in a training phase, to modify the training speaker utterances provided by the speaker in the training phase using a noise sample to obtain modified training speaker utterances, to modify a second set of sample speaker utterances using the noise sample to obtain a modified set of background speaker utterances wherein said second set comprises speaker utterances taken from a population of speakers that is less that in the first set, to generate an adapted target speaker model by using feature vectors extracted from the modified training speaker utterances to adapt the general speaker model, and to generate a set of adapted background speaker models by using feature vectors extracted from the modified set of background speaker utterances to adapt the general speaker model;

ii) a matching module adapted to receive a test voice sample, to calculate a target match score based on a comparison between the adapted target speaker model and the received test voice sample, and to calculate a set of background match scores based on a comparison between the set of adapted background speaker models and the test voice sample; and iii) a verification module adapted to determine a final match score representing the degree of matching between the characteristics of the training speaker utterance and the test voice sample and to verify the identity of the speaker based on the final match score, wherein the final match score is dependent on the difference between the target match score and the mean background match scores.

11. A system according to claim 10, wherein the final match score is dependent on the difference between the target match score and the mean background match scores divided by the standard deviation of the background match scores.

12. A system according to claim 10, wherein calculation of the target match score comprises calculation of the probability of a match between the feature vectors associated with the test voice sample and the adapted target speaker model, and calculation of the set of background match scores comprises calculation of the probability of a match between the feature vectors associated with the test voice sample and each of the adapted background speaker models in the set of adapted background speaker models.

13. A system according to claim 10 wherein the computer system is configured to provide further operation comprising calculation of a general match score based on a comparison between the general speaker model and a test voice sample.

14. A system according to claim 13, wherein calculation of the general match score comprises calculation of the probability of a match between the feature vectors associated with the test voice sample and the general speaker model.

15. A system according to claim 13, wherein the target match score is normalized with respect to the general match score, and each of the background match scores is normalized with respect to the general match score before determining the final match score.

16. A system according to claim 10, wherein the noise sample is extracted from a part of a test speaker utterance provided by the speaker.

17. A system according to claim 10, wherein generating the adapted target speaker model and the set of adapted background speaker models to adapt the general speaker model is obtained through a modified maximum a posteriori (MAP) approach.

18. A non-transitory computer-readable medium storing instructions, which upon execution by a computer system, performs a method of verifying the identity of a speaker in a speaker verification system, the method comprising:
   i) building a general speaker model using feature vectors extracted from a first set of speaker utterances taken from a large population of speakers;
   ii) receiving training speaker utterances provided by the speaker in a training phase, modifying the received training speaker utterances provided by the speaker in the training phase using a noise sample to obtain modified training speaker utterances, and modifying a second set of sample speaker utterances using the noise sample to obtain a modified set of background speaker utterances, wherein said second set comprises speaker utterances taken from a population of speakers that is less that in the first set;
   iii) generating an adapted target speaker model by using feature vectors extracted from the modified training speaker utterances to adapt the general speaker model, and generating a set of adapted background speaker models by using feature vectors extracted from the modified set of background speaker utterances to adapt the general speaker model;
   iv) receiving a test voice sample and calculating a target match score based on a comparison between the adapted target speaker model and the received test voice sample, and calculating a set of background match scores based on a comparison between the set of adapted background speaker models and the test voice sample;
   v) determining a final match score representing the degree of matching between the characteristics of the training speaker utterance and the test voice sample, wherein the final match score is dependent on the difference between the target match score and the mean background match scores;
   vi) verifying the identity of the speaker in the speaker verification system based on the final match score.

19. A non-transitory computer readable medium according to claim 18, wherein the final match score is dependent on the difference between the target match score and the mean background match scores divided by the standard deviation of the background match scores.

20. A non-transitory computer readable medium according to claim 18, wherein calculating the target match score comprises calculating the probability of a match between the feature vectors associated with the test voice sample and the adapted target speaker model, and calculating the set of background match scores comprises calculating the probability of a match between the feature vectors associated with the test voice sample and each of the adapted background speaker models in the set of adapted background speaker models.

21. A non-transitory computer readable medium according to claim 18 wherein the method further comprises calculating a general match score based on a comparison between the general speaker model and a test voice sample.

22. A non-transitory computer readable medium according to claim 21, wherein calculating the general match score comprises calculating the probability of a match between the feature vectors associated with the test voice sample and the general speaker model.

23. A non-transitory computer readable medium according to claim 21, wherein the target match score is normalized with respect to the general match score, and each of the background match scores is normalized with respect to the general match score before determining the final match score.

* * * * *